(12) United States Patent
Baasch et al.

(10) Patent No.: US 8,726,750 B2
(45) Date of Patent: May 20, 2014

(54) DEVICE FOR ACTUATING A SHIFTING ELEMENT WITH TWO SHIFTING ELEMENT HALVES

(75) Inventors: Detlef Baasch, Friedrichshafen (DE); Ulrich Mair, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 296 days.

(21) Appl. No.: 13/430,783

(22) Filed: Mar. 27, 2012

(65) Prior Publication Data
US 2012/0255387 A1  Oct. 11, 2012

(30) Foreign Application Priority Data
Apr. 7, 2011  (DE) .......................... 10 2011 006 967

(51) Int. Cl.
*F16H 63/14* (2006.01)
*F16H 63/18* (2006.01)

(52) U.S. Cl.
USPC .......................................... 74/335; 74/473.1

(58) Field of Classification Search
USPC ................. 74/473.1, 335; 280/5.511, 5.521
See application file for complete search history.

(56) References Cited

U.S. PATENT DOCUMENTS

| | | | | |
|---|---|---|---|---|
| 5,872,435 A | * | 2/1999 | Bolte et al. ............... | 318/400.14 |
| 6,137,253 A | * | 10/2000 | Galbiati et al. ............... | 318/599 |
| 7,543,823 B2 | | 6/2009 | Buma et al. | |
| 7,735,387 B2 | * | 6/2010 | Ketteler et al. ................. | 74/335 |
| 7,837,202 B2 | * | 11/2010 | Taneda et al. .............. | 280/5.511 |
| 7,841,602 B2 | * | 11/2010 | Simkovics ................. | 280/5.511 |
| 7,887,071 B2 | * | 2/2011 | Grieshaber et al. ..... | 280/124.106 |
| 7,896,360 B2 | * | 3/2011 | Buma ......................... | 280/5.511 |
| 7,909,339 B2 | * | 3/2011 | Pinkos et al. .............. | 280/5.511 |
| 7,926,821 B2 | * | 4/2011 | Zuber ......................... | 280/5.511 |
| 7,931,281 B2 | * | 4/2011 | Maeda et al. .............. | 280/5.511 |
| 7,938,410 B2 | * | 5/2011 | Buma et al. ................ | 280/5.508 |
| 7,988,164 B2 | * | 8/2011 | Schmidt et al. ......... | 280/124.107 |
| 8,109,522 B2 | * | 2/2012 | Pinkos et al. .............. | 280/5.511 |
| 8,419,022 B2 | * | 4/2013 | Blondelet et al. ........... | 280/5.521 |
| 8,562,009 B2 | * | 10/2013 | Michel .................... | 280/124.137 |
| 2005/0167932 A1 | * | 8/2005 | Munster ....................... | 280/6.15 |
| 2005/0179220 A1 | * | 8/2005 | Yasui et al. ................ | 280/5.506 |
| 2005/0264247 A1 | * | 12/2005 | Buma et al. .................... | 318/432 |
| 2006/0049601 A1 | * | 3/2006 | Matsumoto ............ | 280/124.106 |
| 2006/0249919 A1 | * | 11/2006 | Suzuki et al. .............. | 280/5.511 |
| 2006/0254845 A1 | | 11/2006 | Baasch et al. | |
| 2010/0072725 A1 | * | 3/2010 | Woellhaf et al. ........ | 280/124.107 |

FOREIGN PATENT DOCUMENTS

| | | |
|---|---|---|
| DE | 43 28 889 C1 | 8/1994 |
| DE | 10 2005 021 901 A1 | 11/2006 |
| DE | 60 2005 003 437 T2 | 10/2008 |

\* cited by examiner

*Primary Examiner* — David M Fenstermacher
(74) *Attorney, Agent, or Firm* — Davis & Bujold, PLLC; Michael J. Bujold

(57) ABSTRACT

A mechanism for actuating a shifting element. A first shifting element half of a brake is axially fixedly connected to a drive machine output shaft, which, when rotational movement of the output shaft equals the disengaging movement of the shifting element, is rotationally fixed to the output shaft. In the event of an engaging force, opposite the disengaging movement of the shifting element, an axial force acts on the output shaft, such that the first shifting element half frictionally engages with an axially and rotationally fixed second shifting element half. In the event of a disengaging force that acts in the disengaging direction of the shifting element, an axial force acts on the motor output shaft such that the first shifting element half of the brake is moved out of frictional engagement with the second shifting element half.

8 Claims, 1 Drawing Sheet

DEVICE FOR ACTUATING A SHIFTING ELEMENT WITH TWO SHIFTING ELEMENT HALVES

This application claims priority from German patent application serial no. 10 2011 006 967.4 filed Apr. 7, 2011.

FIELD OF THE INVENTION

The invention concerns a device for actuating a shifting element with two shifting element halves.

BACKGROUND OF THE INVENTION

All-wheel vehicle drive-trains are increasingly made with frictional shifting elements by means of which, in each case, drive torque that is produced by an internal combustion engine, which is converted in the area of a transmission connected downstream from the internal combustion engine as a function of an overall gear ratio currently engaged in the transmission in an operating-condition-dependent manner, can be distributed in varying degrees of distribution between two driven vehicle axles of the all-wheel drive-train, to influence the driving behavior of the all-wheel vehicle, for example to increase the driving safety.

To do this the transmission capability of such shifting elements has to be changed with high control dynamics in an operating-condition-dependent manner. For that purpose electro-mechanical drive machines are often provided, which comprise an electric drive machine and a drive converter unit, with the drive converter unit being arranged between the drive machine and the shifting element. In the area of the drive converter unit, rotary drive motion of the drive machine is converted into translational movement to actuate the shifting element.

Depending on the application concerned, a transmission ratio stage is provided in the area of the drive converter unit to transform the rotary drive of the drive machine or the drive torque provided by the drive machine to a required level that depends on the application. For this, spur gear stages, worm gear transmissions, cam plates, spindle systems or ball-ramp systems are used as the transmission ratio stage.

By virtue of application-dependent design of the drive converter unit and the resulting transmission ratio between the drive machine and a pressure disk of the shifting element to be actuated by the drive machine, the necessary level of the actuating force to be applied to the shifting element in its closing direction for the desired function of the shifting element, and in turn the drive torque of the drive machine corresponding thereto and a resultant control dynamics, can be varied or adjusted.

The power of the drive machine is designed as a function of the desired control time or closing time of the shifting element, an air gap in the area of a frictional shifting element, the component elasticities of the frictional shifting element, the component elasticities of further structural elements present in the force flow, the inertia of the drive machine and the size of the transmission ratio between the drive machine and the shifting element to be actuated by the drive machine. In addition, for the design of the drive machine and the drive converter unit combined therewith, wear that takes place over the operating life of a shifting element is also taken into account since an enlargement of the air gap caused by wear increases the control path.

If the transmission capability of a frictional shifting element has to be set, as a function of a corresponding requirement during the operation of an all-wheel drive-train, at a torque value determined, for example specified, by a vehicle computer and then maintained at that level for longer operating times, then on the part of the drive machine a holding force has to be made permanently available. When the drive machine is made as an electric motor, then to maintain the level of the torque capability of the frictional shifting element the electric motor has to be permanently energized with a current sufficient to do this. However, such a permanent current flow is undesirable since on the one hand it imposes a load on the electrical and electronic components, and on the other hand it increases the fuel consumption of the vehicle.

Various measures are provided in known systems to reduce the current demand for the operation of an electric motor, during a transmission capability maintaining phase of a frictional shifting element as described above.

For example, in the transmission path between the electric motor and the frictional shifting element respective gears are provided, which are of self-locking design. Thanks to the self-locking of the additional gear system the transmission capability of the frictional shifting element can be maintained at a desired level with small electric motor actuation currents, and the transmission capability of the frictional shifting element is only changed by higher drive torques of the electric machine.

Disadvantageously, due to the low tooth efficiency in the area of a gear system designed to be self-locking, actuating systems with self-locking require a higher torque from the drive machine over the full operating range of the shifting element than do the actuating systems without self-locking. However, higher actuating forces can only be provided with drive machines of corresponding power. Electric motors with higher power, take up more fitting space and are characterized by higher power uptake.

To be able to produce an actuation system with self-locking that occupies less fitting space, a transmission ratio between the drive machine and the shifting element can be correspondingly increased, but this compromises the control dynamics to a considerable extent. Furthermore, a usually perpendicular arrangement of a worm gear or screw gearset is a space-saving design.

Alternatively, it is known to provide, in the area of the electric motor or at some other point in the force path of the control system between the electric machine and the frictional clutch, an electromagnetic brake which, in operating phases of the frictional shifting element during which the transmission capability has to be kept substantially constant, in its closed operating condition prevents a change of the transmission capability of the shifting element. In this way, when the electromagnetic brake is engaged, the actuating current of the electric motor can sometimes be considerably reduced.

However, the use of electromagnetic holding brakes entails additional control and regulation complexity and requires corresponding hardware for actuating the electromagnetic brakes, thus increasing the manufacturing and development costs. In addition, when there are frequent demands for changing the operating condition of the frictional shifting element to be actuated, then due to the system-inherent control dynamics of the electromagnetic holding brakes, the holding effect that they provide cannot be used to the desired extent, so the current needed for operating the electric motor cannot be reduced as much as desired.

Associated with electro-mechanically actuated starting clutches of transmission devices are so-termed compensation mechanisms, which assist a control process of frictional clutches and with which the current demand of an electric motor can be reduced inexpensively with little control and regulation effort. The compensation mechanisms usually comprise a spring system that is prestressed during assembly, which during the actuation of a shifting element acts in the closing direction of the shifting element and gives up its stored spring energy in a path-dependent manner. The support provided by a compensation mechanism acting in the closing direction can be specified as desired by design means and can also be configured as a function of a characteristic force curve that acts in the opening direction in the area of the shifting element to be actuated. For example the compensation mechanism can be designed as a function of the force characteristic of the shifting element such that only a small actuating force has to be provided by the electric motor and the drive converter unit in order to change the transmission capability of the shifting element, whereby the force to be applied by the electric motor only has to bring about an operating condition change in the area of the drive converter unit without additional external force.

Control systems for shifting elements that are made with compensation mechanisms or compensation devices have the advantage, compared with systems having self-locking or with an electromagnetic brake, that already during assembly a force is stored, which opposes the actuating force of the shifting element that acts in the opening direction of the shifting element as a function of the axial actuation path of the shifting element and, depending on the design of the actuating system for the shifting element, the electric motor essentially only still has to overcome a small residual force during the actuation of the shifting element. If the compensation force provided by the compensation mechanism is smaller than the opposing force that occurs during actuation in the area of the shifting element and acts in the opening direction of the shifting element, then when the electric motor is not energized the shifting element changes as required to its open condition. During operation, spring energies stored respectively in the area of the compensation device or in the area of the shifting element, which result from component elasticities of the compensation device and of the shifting element, are exchanged between the compensation device and the shifting element.

The compensation forces that can be provided by the known compensation devices are limited in embodiments of appropriately space-saving design, so that drive power produced by the electric motor during holding phases cannot be reduced to the desired extent.

SUMMARY OF THE INVENTION

Accordingly, the purpose of the present invention is to provide a mechanism for actuating a shifting element with two shifting element halves which can be operated with little control and regulation effort, is of space-saving design, and with which, compared with actuating systems known from the prior art, the power uptake of a drive machine during holding phases can be reduced to the desired extent without compromising the control dynamics.

The mechanism according to the invention for actuating a shifting element having two shifting element halves, which can be functionally connected with one another to connect at least two components or disengaged so as to break the connection between the components, is made with a drive machine and a drive converter unit in the area of which rotary drive movement of the drive machine can be converted into translational actuating movement of the shifting element. A transmission device is provided between a motor output shaft of the drive machine and the drive converter unit.

A first shifting element half of a friction brake is connected fixed in the axial direction to the motor output shaft of the drive machine, in such manner that if the motor output shaft is rotating in a direction equivalent to an opening movement of the shifting element, the first shifting element half is coupled thereto in a rotationally fixed manner by a freewheel device. In the presence of a closing force that acts opposite the opening movement of the shifting element, in the area of the motor output shaft there is in each case an axial force that results from the tooth geometry in the area of the transmission device, by virtue of which the first shifting element half of the brake can be frictionally engaged with an axially fixed second shifting element half that is designed to be rotationally fixed, such that the axial force applied on the motor output shaft can then be supported in the area of the brake. In the presence of an opening force that acts in the opening direction of the shifting element, in the area of the motor output shaft there is in each case an axial force that results from the tooth geometry in the area of the transmission device, by virtue of which the first shifting element half of the brake can be brought out of frictional engagement with the second shifting element half.

In a simple manner the mechanism according to the invention combines the advantages of a control device which, during a closing phase of the shifting element during which the transmission capability of a shifting element preferably in the form of a frictional shifting element is increased, can be operated with high efficiency and which, during a holding phase in which the transmission capability of the shifting element has to be kept essentially constant, can be operated with poor efficiency or which provides a closing force that acts in opposition to an opening force acting in the opening direction in the area of the shifting element, in order, in a simple manner, to reduce a power uptake particularly during a holding phase, by comparison with known actuating mechanisms.

The mechanism according to the invention provides the above-described advantages with a load-sensitively and rotation-direction-dependently acting brake in the area of the drive machine, such that in a simple manner the load-sensitivity of the brake is derived as a function of the axial force applied in each case in the area of the motor output shaft and resulting from the respective tooth geometry in the area of the transmission device, while the direction sensitivity is functionally provided by virtue of the freewheel device arranged between the motor output shaft and the first shifting element half of the brake as a function of the rotation direction of the motor output shaft.

When required, the shifting element is actuated by the drive machine in the closing direction, the first shifting element half of the friction brake is decoupled in the area of the freewheel from the motor output shaft, whereby the frictional lock between the first and the second shifting element halves of the friction brake does not act in opposition to actuation of the shifting element by the drive machine and at the same time the axial force acting on the motor output shaft and resulting from the tooth geometry in the area of the transmission device is supported in the area of the second shifting element half by the two shifting element halves of the friction brake connected with one another.

When the required operating condition of the shifting element is reached and the drive force in the area of the drive machine is decreased in order to reduce a power uptake of the drive machine that compromises efficiency, actuation of the shifting element starting from the drive machine in the closing direction is interrupted, but in such manner that the reduced drive power of the drive machine does not result in a tooth flank shift in the area of the teeth of the transmission device and in the area of the motor output shaft, as before, the axial force that brings the two shifting element halves into mutual frictional engagement is still applied. Since in the area of the at least partially closed shifting element there is an opening force which acts upon the shifting element in the opening direction, the motor output shaft is rotated by this opening force, minimally and without tooth flank shift in the area of the transmission device, in a direction equivalent to an opening direction of the shifting element, which results in closing of the freewheel. Since the two shifting element halves of the brake are in frictional engagement because of the axial force acting on the motor output shaft, the motor output shaft is at least partially held by the frictional connection in the area of the brake as a function of the size of the friction force present in each case in the area of the brake, whereby a required constant value of the transmission capability of the shifting element can be maintained with a reduced drive torque in the area of the drive machine acting in the closing direction of the shifting element.

Furthermore, the mechanism according to the invention also ensures a desired high control dynamic during an opening process of the shifting element, since with a drive on the motor output shaft from the drive machine acting in the opening direction of the shifting element, one of the two shifting element halves of the friction brake is subjected to an axial force that brings it out of frictional engagement, which again results from the tooth geometry in the area of the transmission device. Despite the then closed freewheel device, the actuation of the shifting element by the drive machine is not opposed by the brake since the first shifting element half is not in frictional engagement with the second shifting element half.

The mechanism according to the invention can be made as a preassembled module if the second shifting element half is designed to be attached to part of the housing of the drive machine.

A pre-assembled and additionally space-saving embodiment of the mechanism according to the invention is obtained if the second shifting element half is part of the housing of the drive machine.

In a further advantageous embodiment, the friction surfaces of the shifting element halves that can be brought into mutual frictional engagement are arranged substantially parallel to one another and are also orientated essentially perpendicularly to a line of symmetry of the motor output shaft, whereas in another embodiment the friction surfaces of the shifting element halves of the brake that can be brought into mutual frictional engagement intersect the symmetry line of the motor output shaft at an acute angle. In a simple manner the last-mentioned embodiment offers the possibility of making the brake in the form of a conical brake, so that by virtue of the cone angle an amplification factor that depends on the application concerned can be obtained.

If in the area of the brake a closing friction force can be produced which acts in opposition to the opening movement of the shifting element, which is a function of the axial force that results from the tooth geometry in the area of the transmission device and acts on the motor output shaft, and is of a size such that the shifting element can change to a fully open operating condition against the closing friction force, then in the event of a function failure of the drive machine the shifting element will by itself change to its fully open operating condition without any corresponding drive action from the drive machine.

In contrast, if in the area of the brake a closing friction force can be produced which acts in opposition to the opening movement of the shifting element, which is a function of the axial force that results from the tooth geometry in the area of the transmission device and acts on the motor output shaft, and is of a size such that the shifting element can be held by the closing friction force in a currently existing operating condition, then the power uptake of the drive machine, particularly during holding phases of the shifting element in which the transmission capability of the shifting element should be kept essentially constant, can be reduced to a minimum.

Both the characteristics specified in the claims and also those indicated in the example embodiments of the mechanism according to the invention described below, whether considered in isolation or in any desired combination with one another, are appropriate as further developments of the object according to the invention. In relation to such further development of the object of the invention, the respective combinations of characteristics do not represent any limitation, but are presented essentially only as examples.

BRIEF DESCRIPTION OF THE DRAWING

Further advantages and advantageous further developments of the invention emerge from the claims and from the example embodiment whose principle is described below with reference to the drawing.

The sole FIGURE of the drawing shows a schematic representation of an embodiment of the mechanism according to the invention for actuating a shifting element.

DETAILED DESCRIPTION OF THE PREFERRED EMBODIMENTS

Figure 1:
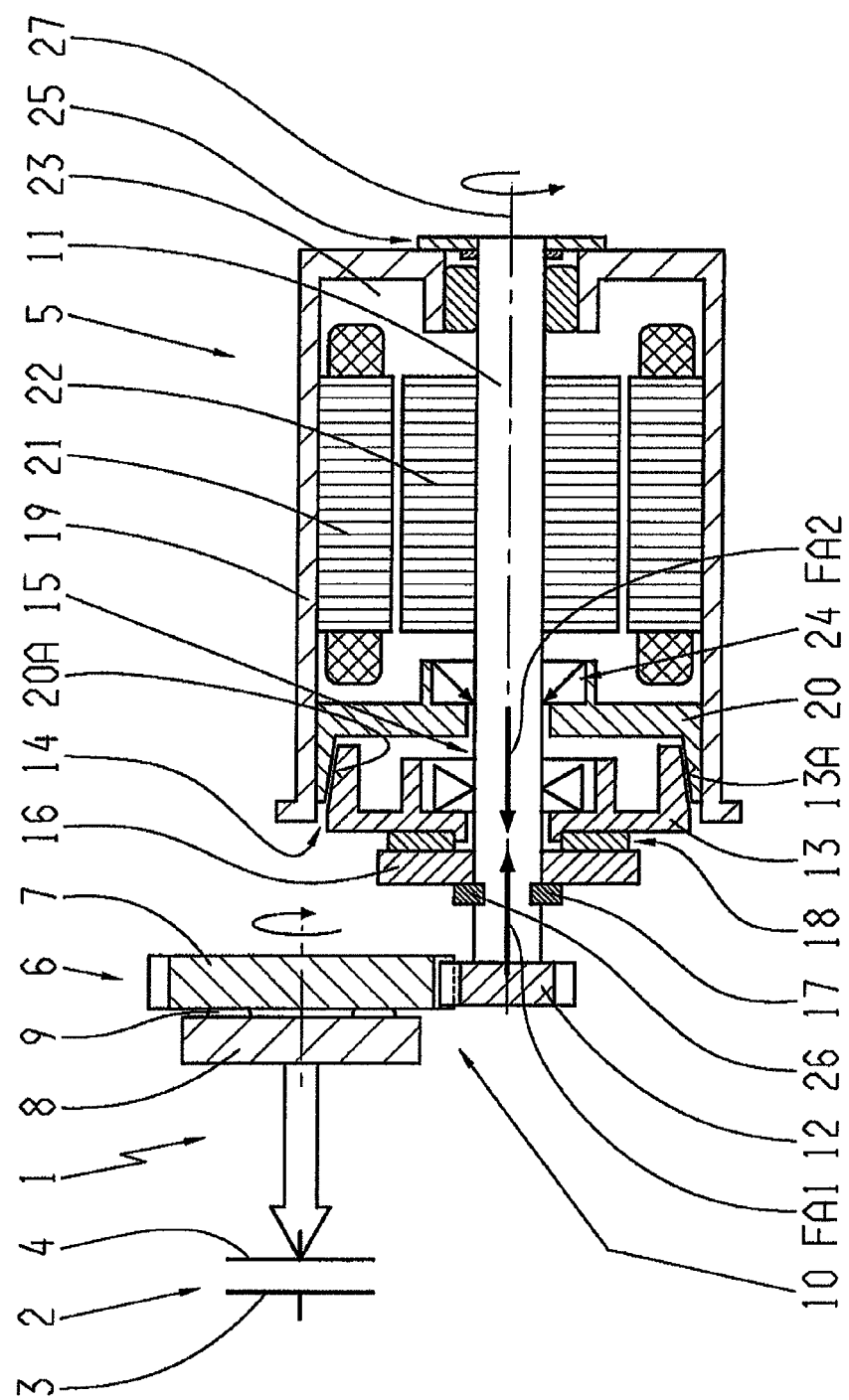

The FIGURE shows a mechanism 1 for actuating a shifting element 2, in this case in the form of a frictional clutch, or changing an operating condition of the shifting element 2. The shifting element 2 has two shifting element halves 3, 4 which can be functionally connected with one another in order to connect two components or which can be disengaged in order to break the connection between the components. In the present case the shifting element 2 or disk clutch is an all-wheel distributor clutch of an all-wheel vehicle drive-train, by means of which, as a function of the transmission capability set in each case, a drive torque provided by a drive motor of the all-wheel drive-train can be distributed with varying degrees of distribution between two driven vehicle axles of the all-wheel drive-train. In the fully open operating condition of the shifting element 2, the drive torque of the drive motor is transmitted completely in the direction of one of the driven vehicle axles.

To actuate the shifting element 2, the mechanism 1 comprises a drive machine 5 in this case in the form of an electric motor and, arranged between the drive machine 5 and the shifting element 2, a drive converter unit 6 in the area of which rotary drive motion of the drive machine 5 can be converted into translational actuating movement of the shifting element 2.

Depending on the application in each case, the drive machine 5 can also be made as a hydraulic motor or the like, by which the rotary drive needed for actuating the shifting element 2 can be provided to the desired extent.

In the present case the drive converter unit 6 comprises two devices 7, 8 that are functionally connected with one another, which are formed as ball-ramp disks and are parts of a ball-ramp system. Arranged between the ball-ramp disks 7 and 8, which in a known way are each made with ball control surfaces, are ball elements 9 so that rotational movement of the axially fixed ball-ramp disk 7 relative to the ball-ramp disk 8, which can move in the axial direction but is rotationally fixed, results in an axial displacement of the ball-ramp disk 8. During this, depending on the drive rotation direction imposed in the area of the drive machine 5, the ball-ramp disk 8 either moves in the direction toward the shifting element 2 or away from it.

The ball ramp disk 7 is in this case part of a transmission device 10 provided between a motor output shaft 11 of the drive machine 5 and the drive converter unit 6. The transmission device 10 here is in the form of a spur gear stage with helical gears, such that the ball ramp disk 7 meshes with a helical spur gear 12 connected to the motor output shaft 11 in a rotationally fixed manner.

A first shifting element half 13 of a friction brake 14 is connected axially fixed to the motor output shaft 11, and when the motor output shaft 11 rotates in a direction equivalent to an opening movement of the shifting element 2, the first shifting element half 13 is connected in a rotationally fixed manner to the motor output shaft 11 by means of a freewheel device 15.

The first shifting element half 13 of the brake 14 is in this case mounted in a fixed axial position on the motor output shaft 11 by means of a bearing plate 16 held in the axial direction by a shaft ring 17 fitted in an annular groove 26 of the motor output shaft 11. Between the bearing plate 16 and the first shifting element half 13 is provided an axial bearing device 18, whereby the axial forces can be transferred from the bearing plate 16 and thus also the motor output shaft 11 to the first shifting element half 13 while at the same time the bearing plate 16 and the first shifting element half 13 are rotationally decoupled.

Together with the first shifting element half 13 of the brake 14, the motor output shaft 11 is designed to be able to move axially within a housing 19 of the drive machine 5, so that the first shifting element half 13 of the brake 14, in this case made as a conical brake, can be brought into frictional engagement with a second shifting element half 20 of the brake 14. The second shifting element half 20 is part of the housing of the drive machine 5, and to seal off an inside space 23 of the housing 19 that encloses a stator 21 and a rotor 22 of the drive machine 5, a sealing device 24 is provided between the second shifting element half 20 and the motor output shaft 11.

An axial displacement path of the motor output shaft 11 relative to the spur gear 12 in the direction of the housing 19 is limited by the brake 14, while an opposite axial displacement of the motor output shaft 11 is limited by a further axial bearing device 25 in the opposite direction.

Starting from a fully open operating condition of the shifting element 2 in which essentially no torque can be transmitted thereby, if a corresponding need then arises to set a defined transmission capability in the area of the frictional shifting element 2, the drive machine 5 is appropriately energized. The rotation direction resulting from being energized opens the freewheel device 15, so that the first shifting element half 13 is decoupled from the motor output shaft 11. An axial force FA1 resulting from the tooth geometry of the helical gearing of the transmission device 10 then acts upon the motor output shaft 11 in the direction of the first shifting element half 13 and pushes the motor output shaft 11 together with the first shifting element half 13 toward the second shifting element half 20 of the brake 14, whereby the two shifting element halves 13 and 20 come into frictional engagement with one another.

The axial force FA1 is transmitted to the first shifting element half 13 by way of the shaft ring 17, the bearing plate 16 and the axial bearing device 18, and is supported on contact between a frictional surface 13A of the first shifting element half 13 and a frictional surface 20A of the second shifting element half 20 in the area of the axially fixed and rotationally fixed second shifting element half 20. In this operating condition of the mechanism 1, with a corresponding frictional torque between the two shifting element halves 13 and 20, the first shifting element half 13 too is held in a rotationally fixed manner, so that by virtue of the open freewheel 15, the rotary movement of the motor output shaft 11 is not prevented by the closed conical brake 14. Due to the support of the axial force FA1 acting in the area of the motor output shaft 11 by the axial bearing device 18, the drive torque of the drive machine 5 acting in the closing direction of the shifting element 2 can be transmitted with high efficiency to the transmission device 10 and applied, via the gear ratio of the drive converter unit 6, in the area of the shifting element 2.

The friction surfaces 13A and 20A of the shifting element halves 13 and 20 of the brake 14 that can be brought into mutual frictional engagement are arranged substantially parallel to one another, such that notional extensions of the friction surfaces 13A and 20A intersect a symmetry line 27 of the motor output shaft 11 at an acute angle.

If a required operating condition of the shifting element 2 or a desired transmission capability of the shifting element 2 has been set by means of the drive machine 5 and if the currently existing transmission capability is to be maintained by virtue of an existing operating condition of an all-wheel vehicle drive-train along with low power uptake in the area of the drive machine 5, the current energizing the drive machine 5 is reduced to a corresponding level.

Depending on the design of the brake 14 and the drive converter unit 6, starting from a current rotational position of the motor output shaft 11 and due to a design-related opening force that acts in the opening direction in the area of the shifting element 2, this reduction of the energization of the drive machine 5 during the phase of maintaining the transmission capability of the shifting element 2 brings about minimal rotation movement of the motor output shaft 11, such that the rotation direction of the motor output shaft 11 during the back-rotation is equivalent to a rotation direction of the motor output shaft 11 acting in the opening direction of the shifting element 2. Due to the back-rotation of the motor output shaft 11, a rotationally fixed connection is formed between the first shifting element half 13 and the motor output shaft 11 by means of the freewheel device 15, so that further back-rotational movement of the motor output shaft 11 is at least partially opposed in the area of the brake 14 depending on the frictional force existing between the shifting element halves 13 and 20.

However, the reduction of the drive power of the drive machine 5 does not give rise to a tooth flank shift in the area of the mutually engaged tooth profiles of the transmission device 10, so that in the area of the motor output shaft 11 the axial force FA1 acting in the direction of the housing 19 is applied just as before. This means that the rotational movement of the motor output shaft 11 in the opening direction of the shifting element 2, initiated by the reduction of the drive power of the drive machine 5, takes place without a tooth flank shift and the brake 14 is engaged as before. Since the freewheel device 15 blocks any rotational movement between the first shifting element half 13 and the motor output shaft 11, further back-rotation of the motor output shaft in the opening direction of the shifting element 2 is at least partially restricted or prevented in the area of the brake 14, depending on the design of the brake 14. To be able nevertheless to maintain the transmission capability of the shifting element 2 at the set level, the holding torque provided by the brake 14, which is sometimes insufficient, has to be additionally increased to the necessary level by a corresponding holding power of the drive machine 5.

If there is a corresponding need to reduce the transmission capability of the shifting element 2, the drive torque of the drive machine 5 can be further reduced until the back-rotating torque that starts from the shifting element 2 and acts in its opening direction, which is applied, via the drive converter unit 6, to the motor output shaft 11, is larger than the holding torque provided by the brake 14 and acting additionally on the motor output shaft 11. From this operating condition of the mechanism 1, the shifting element 2 opens autonomously while there is still a small drive torque of the drive machine 5 acting in the closing direction of the shifting element 2.

If the transmission capability of the shifting element 2 is to be reduced with a higher control dynamic, the drive machine 5 must be energized appropriately so that the motor output shaft 11 moves with a rotational direction acting in the opening direction of the shifting element 2. The result of actuating the drive machine 5 in the opening direction of the shifting element 2 is that the motor output shaft 11 rotates in the direction opposite to that for closing the shifting element 2. The active rotational direction reversal in the area of the motor output shaft 11 leads to a tooth flank shift in the area of the transmission device 10, whereby the axial force applied in the area of the motor output shaft 11 changes its direction and, relative to the drive machine 5, acts in the direction toward the spur gear 12, this axial force acting oppositely to the axial force FA1 being represented in the FIGURE by the arrow indexed FA2.

The axial force FA2 on the motor output shaft 11 brings the first shifting element half 13, which is connected in a rotationally fixed manner by the freewheel device 15 to the motor output shaft 11, out of frictional engagement with the second shifting element half 20 of the brake 14, whereby the brake 14 is disengaged and an opening process of the shifting element 2 or reduction of its transmission capability is not impeded by any frictional torque in the area of the brake 14.

If by energizing the drive machine 5 in the opening direction the transmission capability of the shifting element 2 has been reduced to a required level, and if the transmission capability has to be held at this newly set level, then a holding torque acting in the closing direction of the shifting element 2 is again provided by the drive machine 5, whereby a tooth flank shift takes place in the area of the transmission device 10. In turn this new tooth flank shift causes an axial force FA1 to be applied again to the motor output shaft 11, which brings the two shifting element halves 13 and 20 into mutual frictional engagement in the manner described earlier, so that by means of both the drive machine 5 and the brake 14 the shifting element 2 is held in its currently set operating condition while the power uptake in the area of the drive machine 5 is low.

The mechanism 1 according to the invention described above can be operated without additional control units or further active elements such as an electromagnetic holding brake or the like, with little control and regulation effort, inexpensively, and is at the same time space-saving. The mechanism 1 according to the invention is suitable for actuating shifting elements of any design, such as frictional and/or interlocking shifting elements which can be in the form of clutches or brakes. By virtue of the mechanism 1 the energy consumption in the area of the rotary drive, such as that of an electric motor, a hydraulic drive motor or the like, can be reduced by means of the brake 14 provided in the area of the motor output shaft 11, in a space-saving manner along with little design complexity and without additional actuation effort, while ensuring high control dynamics.

Indexes

1 Mechanism
2 Shifting element
3 Shifting element half
4 Shifting element half
5 Drive machine
6 Drive converter unit
7 Device, ball-ramp disk
8 Device, ball-ramp disk
9 Ball element
10 Transmission device
11 Motor output shaft
12 Spur gear
13 First shifting element half
13A Friction surface
14 Brake
15 Freewheel device
16 Bearing plate
17 Shaft ring
18 Axial bearing device
19 Housing
20 Second shifting element half
20A Friction surface
21 Stator
22 Rotor
23 Inside space
24 Sealing device
25 Further axial bearing device
26 Annular groove
27 Line of symmetry of the motor output shaft
FA1 Axial force
FA2 Axial force

The invention claimed is:

1. A mechanism (1) for actuating a shifting element (2) having two shifting element halves (3, 4), which are either functionally connectable with one another to connect at least two components or disengaged from one another to break the connection between the two components;
a drive machine (5);
a drive converter unit (6) in an area of which rotary drive motion of the drive machine (5) being converted into translational actuation movement of the shifting element (2);
a transmission device (10) being provided between a motor output shaft (11) of the drive machine (5) and the drive converter unit (6),
a first shifting element half (13) of a friction brake (14) being connected, fixed in an axial direction, to the motor output shaft (11), which by way of a freewheel device (15) being coupled, in a rotationally fixed manner, to the motor output shaft (11), when a rotational direction of the motor output shaft (11) is equivalent to a disengaging movement of the shifting element (2), and, in the presence of an engaging force acting in opposition to the disengaging movement of the shifting element (2), in each case an axial force (FA1) that results from a tooth geometry in an area of the transmission device (10) being applied in an area of the motor output shaft (11), by virtue of which the first shifting element half (13) of the brake (14) is brought into frictional engagement with a second shifting element half (20) that is both axially and rotationally fixed, and the axial force (FA1) acting on the motor output shaft (11) is then supportable in an area of the brake (14), whereas in the presence of a disengaging force acting in a disengaging direction of the shifting element (2), a respective axial force (FA2) that results from the tooth geometry in the area of the transmission device being applied in the area of the motor output shaft (11), by virtue of which the first shifting element half (13) of the brake (14) can be moved out of frictional engagement with the second shifting element half (20).

2. The mechanism according to claim 1, wherein the second shifting element half (20) is connected to a housing (19) of the drive machine (5).

3. The mechanism according to claim 1, wherein the second shifting element half (20) is part of a housing of the drive machine (5).

4. The mechanism according to claim 1, wherein friction surfaces of the first and the second shifting element halves of the brake, that are mutually frictionally engagable, are arranged parallel to one another and are orientated substantially perpendicularly to a symmetry line of the motor output shaft.

5. The mechanism according to claim 1, wherein friction surfaces (13A, 20A) of the first and the second shifting element halves (13, 20) of the brake (14), that are mutually, frictionally engagable, are arranged parallel to one another and intersect a symmetry line (27) of the motor output shaft (10) at an acute angle.

6. The mechanism according to claim 1, wherein an engaging friction force that can be produced in the area of the brake (14) and that opposes the disengaging movement of the shifting element (2), which is a function of the axial force (FA1) that results from the tooth geometry in the area of the transmission device (10) and acts on the motor output shaft (11), is of a size such that the shifting element (2) can be changed to its fully disengaged operating condition in opposition to the engaging friction force.

7. The mechanism according to claim 1, wherein an engaging friction force that can be produced in the area of the brake (14) and that opposes the disengaging movement of the shifting element (2), which results as a function of the axial force resulting from the tooth geometry in the area of the transmission device and acts upon the motor output shaft, is of a size such that the shifting element can be held by the engaging friction force in a currently existing operating condition.

8. The mechanism according to claim 1, wherein an axial force (FA2) that results from the disengaging force present in the area of the motor output shaft (11) and acting in the disengaging direction of the shifting element (2), is supported in an area of an axial bearing device (25) of the motor output shaft (11).

* * * * *